US006770224B2

United States Patent
Bair et al.

(10) Patent No.: US 6,770,224 B2
(45) Date of Patent: Aug. 3, 2004

(54) OPTICAL COMPONENT PACKAGE

(75) Inventors: Harvey Edward Bair, Chester, NJ (US); John William Osenbach, Kutztown, PA (US)

(73) Assignee: TriQuint Technology Holding Co., Hillsboro, OR (US)

(*) Notice: Subject to any disclaimer, the term of this patent is extended or adjusted under 35 U.S.C. 154(b) by 499 days.

(21) Appl. No.: 09/814,909

(22) Filed: Mar. 22, 2001

(65) Prior Publication Data
US 2004/0124562 A1 Jul. 1, 2004

Related U.S. Application Data

(60) Provisional application No. 60/211,744, filed on Jun. 15, 2000.

(51) Int. Cl.[7] ............................ B29D 11/00; B29C 71/02
(52) U.S. Cl. .................. 264/1.1; 264/235; 264/331.12; 264/346; 525/537
(58) Field of Search ................................ 264/235, 346, 264/328.1, 331.12, 1.1, 1.25; 525/535, 537; 425/445, 446

(56) References Cited

U.S. PATENT DOCUMENTS 5,120,804 A * 6/1992 Inoue et al. ................. 525/537

FOREIGN PATENT DOCUMENTS

| EP | 930150 | * 7/1999 |
| JP | 7-332370 | * 12/1995 |

* cited by examiner

Primary Examiner—Mathieu D. Vargot

(57) ABSTRACT

A process for forming a polyphenylene sulfide (PPS) component is disclosed. The PPS is molded at a temperature of about 110° C. to about 150° C. After molding, the PPS has a morphology that is at least fifty percent polycrystalline. The component is then annealed to further increase the polycrystalline portion of the PPS morphology. To effect this increase, the component is annealed at a temperature that is at least above the glass transition temperature of the molded PPS component but below its melting temperature. The component is used in optical applications and other applications in which alignment tolerances are small.

5 Claims, 1 Drawing Sheet

OPTICAL COMPONENT PACKAGE

STATEMENT OF RELATED APPLICATION

This application claims priority of U.S. Provisional Application, Serial No. 60/211,744 filed Jun. 15, 2000 and entitled "Optical Component Package".

BACKGROUND OF THE INVENTION

1. Technical Field

The present invention is directed to an optical assembly or module containing at least two optical devices coupled together, and in particular, the housing for the optical devices in the package.

2. Art Background

In order to accommodate the ever-increasing demand for high-speed, high-volume communication of information, optical communication systems are being developed at a rapid pace. Optical communication systems provide high-speed communications because they provide higher bandwidth (i.e. they are capable of simultaneously transmitting a higher number of signals) than standard electronic communication systems.

Optical communication systems have, at their core, optical fibers for the transmission of optical signals that carry information. These optical fibers interface with a variety of optical modules that introduce signals into and receive signals from the optical fibers. The optical modules perform an array of functions.

Optical modules typically have one or more optical devices and associated electronics therein. Such optical modules are referred to as optoelectronics because of the presence of both optical and electrical components therein.

Packaging for optical modules presents a variety of issues. Packaging issues for optical modules are described in U.S. Pat. No. 5,337,396 to Chen et al. and U.S. Pat. No. 5,596,665 to Kurishama et al. As noted in Kurishama et al., one predominant issue is alignment precision between optical components (e.g. semiconductor lasers, photodiodes, etc.) and optical fibers. In Kurishama et al., the optical component is placed in a sleeve and the sleeve containing the optical component is placed in the housing for the module. After the optical component is placed in the housing, further steps are taken to assemble the module. These steps include forming electrical and optical interconnections between the optical components and other portions of the module (i.e. a ferrule for optical interconnection, an electrical circuit for controlling the laser, etc.). Alignment of the optical component must be maintained during these subsequent assembly steps. Also, the module must be assembled so that alignment is preserved when the module is shipped and handled. Alignment must also be preserved when the module is exposed to operating temperature conditions as well as changes in temperature under operating bias when in service.

The housing for optical components is typically made of metal or ceramic at least in part to provide mechanical strength. Significant cost reduction is possible if such housings are made of plastic. One problem associated with plastic housings is that they shrink or expand in response to respective decreases and increases in temperature. When optical components are packaged into the plastic housing, they are subjected to changes in temperature during steps such as soldering, wirebonding etc. The shrinkage or expansion of the assembly that can occur as a result of the temperature changes associated with the assembly steps can adversely affect the alignment of the optical devices in the optical module. Consequently, housings for optical components that undergo shrinkage or expansion when subjected to a change in temperature, compared to current housings, are sought.

SUMMARY OF THE INVENTION

The present invention is directed to a housing adapted to receive an optical device. The housing is then incorporated into an optical assembly or module. A key aspect of an optical assembly is the alignment of the optical components within the assembly. An assembly in which the components are not aligned with acceptable tolerances (typically less than or equal to 5 $\mu$m, depending on optical power requirements) will not function properly. As previously noted, a housing that undergoes a change in dimension in response to a change in temperature can adversely affect the alignment of an optical component within an optical assembly and thus render the device a failure. The housing of the present invention is less susceptible to undesired changes in dimension than previous housings.

The housing or module of the present invention has one or more molded polyphenylene sulfide components. The polyphenylene sulfide component is formed by introducing polyphenylene sulfide into a mold at a temperature of about 110° C. to about 150° C. It is advantageous if the mold temperature is about 120° C. to about 150° C. Molding the polyphenylene sulfide component at this temperature ensures that the polyphenylene sulfide component is at least fifty percent crystalline. As used herein, percent crystallinity is the percent of the material that exhibits a polycrystalline morphology compared to an amorphous morphology. Once skilled in the art can readily make this determination. For example, using a differential scanning calorimeter (DSC), the experimental heat ($\Delta Q_f$) required to melt the crystals is first determined. The $\Delta Q_f$ is then divided by the heat of fusion for PPS (71 J/g). The ratio of $\Delta Q_f/\Delta H_f$ times 100 equals percent crystallinity ($\chi$).

After molding, the component is then annealed under conditions that increase the portion that is polycrystalline. This is accomplished by annealing at a temperature that is at least above the glass transition temperature ($T_g$) of the polyphenylene sulfide. The Tg is defined as the temperature of half-vitrification (½ $\Delta C_p$). $C_p$ is the specific heat (as measured by DSC) and $\Delta C_p$ is the difference between the specific heat of the liquid state ($C_{p\ liquid}$) and the specific heat of the glass state ($C_{p\ glass}$) at the Tg. Alignment and alignment stability requirements determine the amount of crystallinity that is desired for a given polyphenylene sulfide material.

The applicants have observed that the polyphenylene sulfide undergoes both irreversible and reversible dimensional changes in response to changes in temperature. Applicants have discovered that there is a relationship between the crystallinity of the polyphenylene sulfide and the irreversible changes in dimension that are caused by changes in temperature. The process of the present invention forms a polyphenylene sulfide component with increased crystallinity over prior art components. As a result of the increased crystallinity, the polyphenylene sulfide components formed by the process of the present invention undergo smaller irreversible changes in dimension when subjected to temperatures above their $T_g$ (compared to polyphenylene sulfide components not formed by the present process).

As a result of the process of the present invention, the irreversible dimensional changes of the polyphenylene sulfide component in response to a thermal cycle is less than 0.06 percent or less than 0.02 percent when annealed. As used herein, a thermal cycle is one in which the temperature of the polyphenylene sulfide component goes from about room temperature (e.g. 20° C.) to a high processing temperature and then back to 20° C. In the context of assembling optoelectronic devices, high temperatures are typically in the range of about 150° C. to about 200° C.

DETAILED DESCRIPTION

Figure 1:
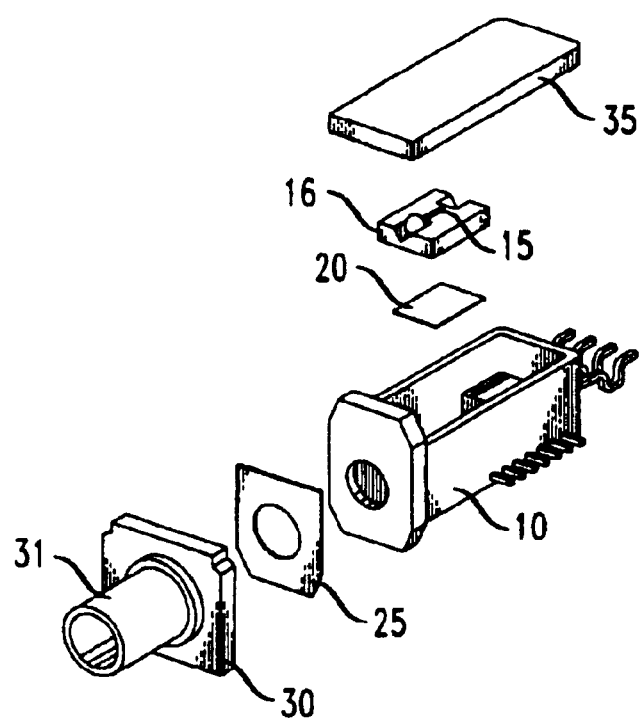
FIG. 1 is an expanded perspective view of a sleeve for a laser device.

In the present invention, a mold is provided to configure a polyphenylene sulfide component when polyphenylene sulfide is injected into the mold. Molding conditions are selected so that the polyphenylene sulfide component has a crystallinity of at least about fifty percent. The crystallinity of polyphenylene sulfide is obtained by molding the polyphenylene sulfide at a temperature of about 110° C. to about 150° C. It is advantageous if the molding temperature is about 120° C. to about 150° C. Molding at a temperature in the defined range provides a polyphenylene sulfide component that has a morphology that is at least fifty percent polycrystalline. After molding, the polyphenylene sulfide is annealed at conditions that further increase the portion of the polyphenylene sulfide that is polycrystalline.

In order to effect an increase in the portion of the polyphenylene sulfide that is polycrystalline, the subsequent anneal is at least above the $T_g$ of polyphenylene sulfide. The $T_g$ of polyphenylene sulfide depends upon the amount of the polyphenylene sulfide that is in the polycrystalline state. The Tg of amorphous PPS is about 84° C. The $T_g$ of polyphenylene sulfide that is fifty percent polycrystalline is about 104° C. One skilled in the art will appreciate the amount of polyphenylene sulfide that is polycrystalline depends upon the temperature of the mold.

For example, polyphenylene sulfide that is molded at a temperature of 120° C. is about fifty percent polycrystalline and has a $T_g$ of about 104° C. By contrast, polyphenylene sulfide that is molded at a temperature of 135° C. is about 64 percent polycrystalline and has a $T_g$ of about 115° C.

The extent to which the polycrystallinity of the polyphenylene sulfide is increased by the subsequent anneal is largely a matter of design choice (i.e. alignment and alignment stability requirements). One skilled in the art will appreciate that the higher the temperature of the anneal and the longer the polyphenylene sulfide component is held at that temperature, the greater the percentage increase of polycrystallinity. Furthermore, the greater the percentage of polycrystallinity, the greater the ability of the PPS to resist mechanical deformation. It is advantageous if the anneal temperature does not exceed about 250° C. (i.e. about 30° C. below the maximum melting temperature).

An example of a molded housing adapted to receive an optical component is illustrated in FIG. 1. The molded housing has a main body 10 in which a semiconductor laser component 15 is placed. The laser component 15 is mounted on a bracket 16 for holding the laser 15 in place. The bracket is made of a material such as, for example, ceramic, silicon or gallium arsenide. The bracket is fixed to a pad 20, which, in turn, is affixed to the body 10.

After the laser 15 is positioned in the molded housing 10, a lid 35 is placed on the housing. An optical port 31 is coupled to main body 10 by epoxy 25. The optical port 31 is a ceramic sleeve. The optical port is held in a mounting bracket 30. Mounting bracket 30 is affixed to housing 10 by epoxy 25. Body 10, bracket 30 and lid 35 are molded polyphenylene sulfide components, formed by the process of the present invention. The optical port 31 is adapted to receive an optical fiber (not shown). The assembly illustrated in FIG. 1 is configured to achieve precise alignment of the optical fiber (not shown) with the laser 15. Polyphenylene sulfide, as used herein, contemplates commercially available polyphenylene sulfide which typically contains fillers. The fillers usually consist of some combination of glass fibers and mineral fillers. The polyphenylene sulfide is typically 30 weight percent to 65 weight percent filler.

EXAMPLE 1

Laser housings, such as those depicted in FIG. 1, were molded in a single cavity molds. The material injected into the mold was polyphenylene sulfide (PPS). The PPS was Fortron® 6165 that was commercially obtained from Hoechst Celanese of Summit, N.J. The last two digits (65) indicate that the PPS was sixty-five percent filler. Molding occurred at four temperatures: 107° C. (225° F.); 121° C. (250° F.); 135° C. (275° F.): and 149° C. (300° F.).

The thermal behavior of the housings molded at 107° C. and 135° C. was determined by measuring the specific heat of the housings as a function of temperature. Specifically, after the housings were formed, they were heated at a rate of 15 degrees/minute. The specific heat ($C_p$) of the PPS samples was measured by DSC from 0° C. to 300° C. The degree of polycrystallinity of the PPS in the housings was determined from these measurements. The level of crystallinity, the glass transition temperature ($T_g$) and the melting temperature of these two housings are summarized in Table 1 below:

TABLE 1

| Property | Housing Sled Molded at 107° C. | Housing Molded at 135° C. |
| --- | --- | --- |
| Level of Crystallinity | 20 Percent | 64 Percent |
| Glass Transition Temperature ($T_g$) | 86° C. | 115° C. |
| Melting Temperature ($T_m$) | 282° C. | 284° C. |

Table 1 illustrates that the housing molded at 107° C. had a morphology that was only twenty percent polycrystalline (on average through the thickness of the material). By contrast, the housing molded at 135° C. has a morphology that is 64 percent polycrystalline. The $T_g$ of the housing molded at 107° C. is also lower (e.g. 86° C.) than the $T_g$ of the housing molded at 135° C. The melting temperature of the molded housings was about the same.

The housing molded at 107° C. was observed to liberate 9.7 J/g of heat above 100° C. This indicates that the housing underwent further recrystallization when heated above 100° C.

The thermal expansion and contraction of the two laser housings were observed, as the housings were twice cycled from 20° C. to 150° C. and back. After annealing at 150° C. for one hour, the initial 3.6 mm height of the component molded at 135° C. was observed to decrease by 0.5 microns. Thus, the height dimension decreased by about 0.014 percent (without an anneal, the housing shrank about 0.05% when cycled from 20° C. to 150° C. and back). By contrast, the initial 3.8 mm height of the housing molded at 107° C.

was observed to decrease by about 12 microns after being heated from 20° C. to 150° C. and cooled back to 20° C. The height dimension of the housing molded at 107° C. decreased by about 0.3 percent. Thus, the housing molded at 135° C. was more dimensionally stable than the housing molded at 107° C.

The present invention is described in terms of specific embodiments. These embodiments are provided to illustrate the present invention. Specifically, one exemplary housing made of PPS is illustrated in the specification. One skilled in the art can readily design alternate housing configurations. One of ordinary skill in the art will appreciates that various modifications can be made to the disclosed embodiments that are within the scope of the claims below.

What is claimed is:

1. A process for forming a polyphenylene sulfide housing or module which allows for the precise alignment of optical components comprising:

molding the polyphenylene sulfide at a temperature of about 110° C. to about 150° C. to obtain a molded polyphenylene sulfide housing or module that has a morphology that is at least fifty percent polycrystalline; and annealing the molded polyphenylene sulfide housing or module at a temperature that is above the glass transition temperature of the molded polyphenylene sulfide housing or module to cause an increase in the polycrystalline portion of the polyphenylene sulfide morphology.

2. The process of claim 1 wherein the molded polyphenylene sulfide housing or module is annealed at a temperature of about 105° C. to about 250° C.

3. The process of claim 1 wherein the polyphenylene sulfide is molded at a temperature of about 120° C. to about 150° C.

4. The process of claim 1 wherein the polyphenylene sulfide is molded at a temperature of about 130° C. to about 150° C.

5. The process of claim 1 wherein the polyphenylene sulfide is about 30 weight percent to about 65 weight percent filler.

* * * * *